US012322911B2

(12) United States Patent
Viggiani et al.

(10) Patent No.: US 12,322,911 B2
(45) Date of Patent: Jun. 3, 2025

(54) FEMALE CONTACT WITH AT LEAST ONE NEW WIRE ASSEMBLY

(71) Applicant: Hypertac S.p.A., Genoa (IT)

(72) Inventors: Carlo Viggiani, Genoa (IT); Roberto Tosa, Genoa (IT); Giacomo Gennari, Genoa (IT)

(73) Assignee: Hypertac S.p.A., Genoa (IT)

( * ) Notice: Subject to any disclaimer, the term of this patent is extended or adjusted under 35 U.S.C. 154(b) by 0 days.

(21) Appl. No.: 18/828,444

(22) Filed: Sep. 9, 2024

(65) Prior Publication Data

US 2024/0429663 A1 Dec. 26, 2024

Related U.S. Application Data

(63) Continuation of application No. PCT/IT2024/000009, filed on Mar. 21, 2024.

(30) Foreign Application Priority Data

Mar. 27, 2023 (EP) .................................... 23425011

(51) Int. Cl.
*H01R 24/20* (2011.01)
*H01R 4/18* (2006.01)

(52) U.S. Cl.
CPC ............... *H01R 24/20* (2013.01); *H01R 4/18* (2013.01)

(58) Field of Classification Search
CPC ........ H01R 24/20; H01R 4/18; H01R 4/4863; H01R 13/2421; H01R 39/08; H01R 39/415

(Continued)

(56) References Cited

U.S. PATENT DOCUMENTS 2,914,344 A * 11/1959 Anthes .................... F16L 19/06 285/321
4,805,943 A * 2/1989 Balsells .................. F16B 21/18 267/167

(Continued)

FOREIGN PATENT DOCUMENTS

CN 108574163 A 9/2018
DE 102004002404 B3 9/2005

(Continued)

OTHER PUBLICATIONS

EP Extended Search Report, Application No. 23425011.6, dated Sep. 21, 2023, 19 pps.

(Continued)

*Primary Examiner* — Harshad C Patel
(74) *Attorney, Agent, or Firm* — Armstrong Teasdale LLP

(57) ABSTRACT

A female electrical contact for receiving a male electrical contact is provided. The female electrical contact includes at least one wire assembly for receiving a pin of the male electrical contact, wherein each wire assembly includes a conductive, substantially cylindrical wire-carrier defining an inner part and having a length L along a longitudinal axis, and a plurality of conductive wires configured to contact the pin of the male electrical contact. The female electrical contact further includes a conductive socket configured to receive the at least one wire assembly, and a wiring extremity for connection of the female electrical contact to an electrical cable, wherein the socket and wiring extremity are arranged at opposing ends of the female electrical contact.

19 Claims, 8 Drawing Sheets

(58) Field of Classification Search
USPC .......................................................... 439/668
See application file for complete search history.

(56) References Cited

U.S. PATENT DOCUMENTS

| | | | | | |
|---|---|---|---|---|---|
| 5,082,390 | A * | 1/1992 | Balsells | F16L 37/084 | 285/318 |
| 5,411,348 | A * | 5/1995 | Balsells | F16J 15/0893 | 285/318 |
| 5,545,842 | A * | 8/1996 | Balsells | H05K 9/0016 | 285/318 |
| 5,791,638 | A * | 8/1998 | Balsells | F16F 1/123 | 267/167 |
| 6,835,084 | B2 * | 12/2004 | Poon | H01R 13/187 | 439/352 |
| 6,848,922 | B2 * | 2/2005 | Coughlan | H01R 13/53 | 439/181 |
| 6,895,276 | B2 * | 5/2005 | Kast | H01R 24/58 | 607/37 |
| 7,110,827 | B2 * | 9/2006 | Sage | A61N 1/3752 | 607/116 |
| 7,274,964 | B2 * | 9/2007 | Balsells | A61N 1/3752 | 439/840 |
| 7,294,020 | B2 * | 11/2007 | Zhao | H01R 11/28 | 439/627 |
| 7,429,199 | B2 * | 9/2008 | Burgess | H01R 13/187 | 439/841 |
| 7,914,351 | B2 * | 3/2011 | Balsells | H01R 11/286 | 439/840 |
| 8,057,270 | B2 * | 11/2011 | Shimazu | H01R 13/17 | 439/827 |
| 8,166,623 | B2 * | 5/2012 | Balsells | F16L 37/084 | |
| 8,282,429 | B2 * | 10/2012 | Glick | H01R 13/111 | 439/843 |
| 8,382,532 | B2 * | 2/2013 | Sjostedt | H01R 13/187 | 439/817 |
| 8,382,533 | B2 * | 2/2013 | Pavlovic | H01R 13/187 | 439/840 |
| 8,529,303 | B2 * | 9/2013 | Zhang | F16F 1/04 | 439/840 |
| 8,753,153 | B2 * | 6/2014 | Leon | B21F 35/00 | 439/840 |
| 8,764,489 | B2 * | 7/2014 | Blakborn | H01R 13/187 | 439/626 |
| 8,795,005 | B2 * | 8/2014 | Blakborn | H01R 13/113 | 439/788 |
| 8,851,939 | B2 * | 10/2014 | Bazenas | F16F 1/045 | 439/840 |
| 8,872,050 | B2 * | 10/2014 | Hierl | H01H 1/205 | 200/244 |
| 8,956,169 | B2 * | 2/2015 | Shinder-Lerner | H01R 24/50 | 439/248 |
| 9,190,784 | B1 * | 11/2015 | Oh | H01R 24/28 | |
| 9,203,175 | B1 * | 12/2015 | Osa | H01R 24/60 | |
| 9,267,526 | B2 * | 2/2016 | Balsells | F16L 37/22 | |
| 9,293,849 | B2 * | 3/2016 | Balsells | H01R 13/03 | |
| 9,306,307 | B2 * | 4/2016 | Starke | B21F 11/005 | |
| 9,397,428 | B2 * | 7/2016 | Retho | H01R 13/46 | |
| 9,455,514 | B2 * | 9/2016 | Hirakawa | H01R 13/02 | |
| 9,482,255 | B2 * | 11/2016 | Changsrivong | F16B 21/186 | |
| 9,583,844 | B2 * | 2/2017 | Nespoulous | H01R 4/48 | |
| 9,677,587 | B2 * | 6/2017 | Changsrivong | F16B 21/186 | |
| 9,829,028 | B2 * | 11/2017 | Changsrivong | F16B 21/073 | |
| 10,270,196 | B2 * | 4/2019 | Wang | H01R 13/04 | |
| 10,634,181 | B2 * | 4/2020 | Montague, Jr. | H01R 4/4863 | |
| 10,644,426 | B2 * | 5/2020 | Kimura | H01R 13/6315 | |
| 11,217,928 | B2 * | 1/2022 | Carter | F16F 1/025 | |
| 2004/0034393 | A1 * | 2/2004 | Hansen | A61N 1/3752 | 607/37 |
| 2004/0040150 | A1 * | 3/2004 | Kuwayama | H01R 4/188 | 29/857 |
| 2004/0070128 | A1 * | 4/2004 | Balsells | F16F 1/045 | 267/180 |
| 2004/0180563 | A1 * | 9/2004 | Coughlan | H01R 13/53 | 439/181 |
| 2005/0027325 | A1 * | 2/2005 | Lahti | H01R 13/5224 | 607/37 |
| 2005/0242910 | A1 * | 11/2005 | Balsells | H01R 24/58 | 335/220 |
| 2006/0047322 | A1 * | 3/2006 | Naviaux | A61N 1/3752 | 607/37 |
| 2006/0083582 | A1 * | 4/2006 | Balsells | F16B 21/18 | 403/325 |
| 2006/0127170 | A1 * | 6/2006 | Balsells | F16J 15/3212 | 403/225 |
| 2008/0255631 | A1 * | 10/2008 | Sjostedt | A61N 1/3752 | 607/37 |
| 2009/0130922 | A1 * | 5/2009 | Arnaud | H01R 13/187 | 439/825 |
| 2010/0191299 | A1 | 7/2010 | Ayzenberg | | |
| 2010/0233896 | A1 * | 9/2010 | Dilmaghanian | H01R 13/187 | 439/669 |
| 2011/0266120 | A1 * | 11/2011 | Nakauchi | H01R 13/187 | 200/252 |
| 2012/0003880 | A1 * | 1/2012 | Glick | H01R 13/187 | 439/786 |
| 2012/0129409 | A1 * | 5/2012 | Drew | A61N 1/3752 | 219/121.64 |
| 2020/0119479 | A1 | 4/2020 | Gartenmaier et al. | | |

FOREIGN PATENT DOCUMENTS

| | | | |
|---|---|---|---|
| DE | 202013003507 | U1 | 5/2013 |
| DE | 102019106451 | A1 | 9/2020 |
| EP | 1049206 | A2 | 11/2000 |
| WO | 2010034343 | A1 | 4/2010 |

OTHER PUBLICATIONS

PCT International Search Report and Written Opinion, Application No. PCT/IT2024/000009, dated Jul. 22, 2024, 16 pps.
Smiths Interconnect, HYPER Series, Superior Performing Hypertac Hyperboloid Contact Technology, 20 pps.
TE Connectivity, 2141212-1 Datasheet, Automotive Connectors 8MM HV, Socket Pin Terminal, available at <https://www.mouser.com/ProductDetail/TE-Connectivity/2141212-1?qs=QWBbna512bY%2FTaX2WSDRIw%3D%3D>, 2 pps.

* cited by examiner

FEMALE CONTACT WITH AT LEAST ONE NEW WIRE ASSEMBLY

CROSS-REFERENCE TO RELATED APPLICATIONS

The present application is a continuation of PCT/IT2024/000009 filed on Mar. 21, 2024, and designated the United States, which claims the benefits of EP patent application Ser. No. 23/425,011.6 filed on Mar. 27, 2023, the contents of which are hereby incorporated by reference in their entirety.

FIELD OF DISCLOSURE

The disclosure relates, but is not limited to, female electrical contact for receiving a male electrical contact. The disclosure also relates to a method of manufacture of such a connector.

BACKGROUND

An electrical connector usually includes at least one contact fitted in an insulator. The at least one contact may include a female contact (e.g. including a socket) configured to be mated with a male contact (e.g. a pin) and/or may include a male contact (e.g. a pin) configured to be mated with a female contact (e.g. including a socket).

An electrical plug usually includes a mobile connector. The electrical plug may include male contacts (e.g. including pins) and/or female contacts (e.g. including sockets).

An electrical receptacle usually includes a fixed connector (e.g. fixed in a wall). The electrical receptacle may include male contacts (e.g. including pins) and/or female contacts (e.g. including sockets).

The electrical plug may be mated with the electrical receptacle.

Some sockets may accommodate a plurality of conductive wires for receiving a male electrical contact. The conductive wires are typically made from a copper beryllium (CuBe) alloy.

BRIEF DESCRIPTION

In one aspect, a female electrical contact for receiving a male electrical contact is provided. The female electrical contact includes at least one wire assembly for receiving a pin of the male electrical contact, wherein each wire assembly includes a conductive, substantially cylindrical wire-carrier defining an inner part and having a length L along a longitudinal axis, and a plurality of conductive wires configured to contact the pin of the male electrical contact. The plurality of conductive wires are arranged in the inner part of the wire-carrier so that a direction of extension of each of the conductive wires is slanted with respect to the longitudinal axis of the wire-carrier, opposite ends of the wires are wrapped around respective opposite ends of the wire-carrier to support the wires on the wire-carrier, the plurality of conductive wires are arranged hyperbolically in the inner part of the wire-carrier, so that the wires are configured to align themselves elastically as contact lines around the pin, as the pin is introduced in the female electrical contact, and the plurality of conductive wires include a beryllium-free copper-nickel-silicon alloy. The female electrical contact further includes a conductive socket configured to receive the at least one wire assembly, and a wiring extremity for connection of the female electrical contact to an electrical cable, wherein the socket and wiring extremity are arranged at opposing ends of the female electrical contact.

Aspects and embodiments of the disclosure are set out in the appended claims. These and other aspects and embodiments of the disclosure are also described herein.

BRIEF DESCRIPTION OF THE DRAWINGS

Aspects of the disclosure will now be described, by way of example, with reference to the accompanying drawings in which.

DETAILED DESCRIPTION

Overview

Figure 1:
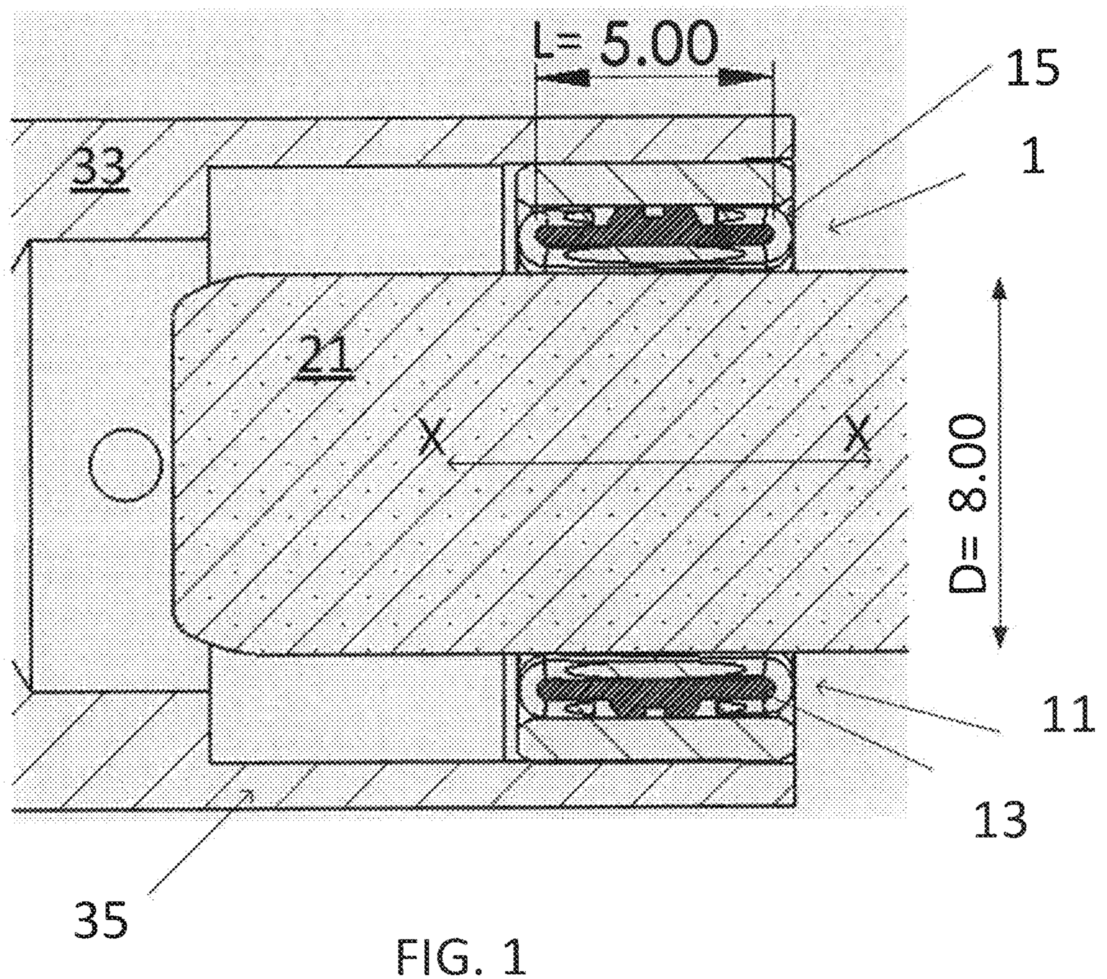
FIG. 1 schematically represents a section view of an example female electrical contact according to the disclosure.

The disclosure relates, but is not limited to, a female electrical contact for receiving a male electrical contact. The female contact includes at least one wire assembly for receiving a pin of the male electrical contact. The wire assembly includes a wire-carrier and a plurality of conductive wire components carried by the wire-carrier. The wire assembly is sometimes referred to as a “cage”.

The plurality of conductive wire components include a beryllium-free copper-nickel alloy. This may mean that the plurality of conductive wire components are made of a beryllium-free copper-nickel alloy. The plurality of conductive wire components may consist essentially of a beryllium-free copper-nickel alloy. The plurality of conductive wire components are beryllium-free. “Beryllium-free” means that the copper-nickel alloy does not include beryllium or may only contain a trace amount of beryllium (e.g., less than 0.1% wt or less than 0.01% wt of beryllium).

Conventional wire cages for electrical contacts use copper beryllium (CuBe) wires. CuBe is a copper alloy that contains between 0.5% wt to 3% wt beryllium. Beryllium can be toxic and carcinogenic to humans particularly when inhaled. In view of this, the use of CuBe wire components in electrical contacts poses a potential health risk to humans.

While the health risks of beryllium copper are known, there has not been a known suitable alternative to CuBe that meet the electrical performance requirements for conductive wire components of female electrical contacts. The conductive wire components may be needed to provide a relatively high current-carrying capacity (e.g., 300 A or more) and as such may require a low contact resistance. The material CuBe meets the challenging electrical performance requirements while still being able to be drawn into a wire and manipulated on the wire-carrier to form the desired wire arrangement.

Advantageously, the inventors been found that beryllium-free copper-nickel alloys can provide the same or improved performance, e.g. high current-carrying capacity and low resistance, as compared to CuBe alloys, when used as conductive wire components carried on a wire carrier in a female electrical contact. This avoids the use of beryllium which is a potential health hazard.

In at least some examples, the copper-nickel alloy is a copper nickel-silicon (CuNiSi) alloy. Significantly, CuNiSi alloys have been found to provide improved performance with respect to CuBe alloys. In particular, female electrical contacts incorporating CuNiSi wire components have been found to have improved electrical conductivity/lower contact resistance as compared to CuBe wire components. A lower resistance means less dissipated power, less heat generated, and improved efficiency of power transfer using the contact. Therefore, using CuNiSi wire components not only avoids the use of beryllium but provides performance improvements for the contacts. This is especially beneficial in high power applications such as where currents greater than 300 A are used. CuNiSi wire components are able to carry more current than CuBe wire components having the same diameter.

For example, in otherwise identical female electrical contact designs, the female electrical contact using CuNiSi wire components was found to have an average resistance of 0.040 mΩ after 500 mating cycles while the female electrical contact using CuBe wire components was found to have an average resistance of 0.057 mΩ after 500 mating cycles.

The CuNiSi alloy includes copper as its main component. The combined percentage weight of copper, nickel and silicon in the CuNiSi alloy may be at least 99.5% wt. The CuNiSi alloy may include trace amounts of other elements such as tin, magnesium, zinc, lead, iron, manganese, and phosphor.

The copper-nickel-silicon alloy may include between 94.0% wt and 99.1% wt copper, and optionally between 94.6% wt and 97.6% wt copper.

The copper-nickel-silicon alloy may include between 0.8% wt, and 4.2% wt nickel, and optionally between 2.2% wt and 4.2% wt nickel.

The copper-nickel-silicon alloy may include between 0.1% wt and 1.2% wt silicon, and optionally between 0.3% wt and 1.2% wt silicon.

The copper-nickel-silicon alloy includes between 94.1% wt and 97.5% wt copper, between 2.2% wt and 4.2% wt nickel, and between 0.2% wt and 1.2% wt silicon.

The plurality of conductive wire components may be plated with a conductive material such as gold, silver, or nickel. The plurality of conductive wire components may include a CuNiSi alloy that is silver plated. Advantageously, silver plating has been found to reduce the contact resistance as compared to other plating materials such as gold.

The plurality of conductive wire components may include a plurality of conductive wires or may be formed from a single conductive wire. The wire carrier may define an inner part and have a length L along its longitudinal axis. The plurality of the conductive wire components may be arranged in the inner part of the wire carrier. The plurality of conductive wire components may extend along the length L of the wire carrier.

The female electrical contact may include a conductive socket configured to receive the at least one wire assembly. The female electrical contact may include a wiring extremity for connection of the female electrical to an electrical cable. The socket may be arranged at a first end of the female electrical contact and the wiring extremity may be arranged at a second end of the female electrical contact. The socket and wiring extremity may be arranged at opposing ends of the female electrical contact.

The wiring extremity may define an internal space arranged to receive an electrical cable. The internal space of the wiring extremity may be bounded by a closed end and an open end. A crimping pin may be located within the internal space and may extend from the closed end of the wiring extremity towards the open end. The wiring extremity is configured to be crimped to join the female electrical contact and the electrical cable. The crimping pin increases the surface area of contact between the electrical cable and the wiring extremity to improve the electrical performance of the crimp.

The disclosure relates, but is not limited to, a female electrical contact for receiving a male electrical contact. The female contact includes a wire assembly for receiving a pin of the male electrical contact. The wire assembly includes a wire-carrier carrying a plurality of conductive wires. The plurality of conductive wires is arranged in an inner part of the wire-carrier so that a direction of extension of each of the conductive wires is slanted with respect to a longitudinal axis of the wire-carrier. The conductive wires may thus define a hyperboloid receiving space for the pin of the male electrical contact. The diameter of the receiving space is substantially equal to D. The wire-carrier has a length L along the longitudinal axis. The length L is smaller than the diameter D. A ratio r can be defined as the quotient $$r = \frac{L}{D}.$$

In this example, the conductive wires are not required to include a beryllium-free copper-nickel alloy and may be formed from any suitable conductive material. For example, the wires may be made of CuBe, CuSnP, or CuNiSi.

The plurality of wires may provide a relatively high current-carrying capacity. However, the electrical conductivity of the wires is comparatively lower than that of any other components of the female electrical contact involved in current conduction, in operation. Having the ratio r under the value 1 causes, in operation, a relatively lower total length of conductive wires in contact with the pin, compared to a total efficient surface of the other components of the female electrical contact involved in current conduction, thus increasing an overall conductivity of the female contact.

For example, a female electrical contact having a wire contact fitted with a wire-carrier having a length L substantially equal to 5 mm, for a diameter D substantially equal to 8 mm (i.e., resulting in r less than 1), e.g., with gold-plated CuBe wires, has a resistance of 0.12 mΩ—whereas a female contact having a length L substantially equal to 10.4 mm, for a diameter D substantially equal to 8 mm (i.e., resulting in r greater than 1), has a resistance of 0.18 mΩ. This example shows that the female electrical contact of the disclosure, having r less than 1 and a smaller electrical resistance, has a higher conductivity.

The electrical conductivity of the female contact, in operation, comparatively increases as the ratio r decreases under the value 1.

Having the ratio r under the value 1 causes the length L of the wire assembly to be relatively short and enables a female contact of a given length A to accommodate more than one wire assembly, e.g. two wire assemblies such that, substantially, L=A/2. Having more than one wire assembly of length L for a female contact increases the current-carrying capacity of the female contact, compared to a female contact having a single wire assembly of length 2L. The female contact of any aspects of the disclosure may be used in many technical fields, in particular, but not only, in fields where currents of 300-350 A are required, such as connectors for charging electrical vehicles.

In cases where the conductive wires define a hyperboloid receiving space, the wire assembly may have a relatively high cycle life for mating with a male contact (up to 100,000 mating cycles). The hyperboloid receiving space may enable relatively low contact resistance. The hyperboloid receiving space may provide a relatively high immunity to mechanical shock, vibration, and/or fretting corrosion. The hyperboloid receiving space may enable a relatively low insertion force. The hyperboloid receiving space may be self-cleaning and may provide a wiping action upon mating with a male electrical contact.

The ratio r may be kept greater than 0.250 to retain the above mechanical properties of the female contact.

DETAILED DESCRIPTION OF EXAMPLE EMBODIMENTS

FIGS. 1 to 7 schematically represent section views of example female electrical contacts according to the disclosure. The female electrical contacts are configured to receive a male electrical contact. In FIGS. 1 to 7, similar elements bear identical reference numerals.

In the figures, a female electrical contact 1 includes at least one wire assembly 11 for receiving a pin 21 of the male electrical contact (see FIG. 1).

In the figures, each wire assembly 11 mainly includes a conductive wire-carrier 13 and a plurality of conductive wire components 15. The conductive wire components 15 are carried by the wire-carrier 13.

The plurality of conductive wire components 15 in this example are in the form of a plurality of conductive wires 15. Opposite ends of the wires are wrapped around respective opposite ends of the wire-carrier 13 to support the wires 15 on the wire-carrier 13. In other examples, the plurality of conductive wire components 15 may be formed from a single wire. The single wire may be manipulated, e.g., wound multiple, times to form the conductive wire components 15.

The plurality of conductive wire components 15 are formed from a beryllium-free copper-nickel alloy and in particular a copper-nickel-silicon, CuNiSi, alloy. A CuNiSi alloy is a copper alloy containing nickel and silicon with copper forming the majority of the percentage weight of the alloy. Other elements may also be present in the alloy, but the percentage weight of copper, nickel and silicon in the CuNiSi alloy is, in general, at least 99.5% wt.

In general, the CuNiSi alloy includes between 94.0% wt and 99.1% wt copper, between 0.8% wt and 4.2% wt nickel, and between 0.1% wt and 1.2% wt silicon, and the combined percentage weight of copper, nickel and silicon is at least 99.5% wt.

Example CuNiSi alloy compositions are provided in Table 1.

| Element | Composition 1 (% wt) | Composition 2 (% wt) | Composition 3 (% wt) |
|---|---|---|---|
| Cu | 94.1-97.5 | 97.8-99.0 | 96.0-96.8 |
| Ni | 2.2-4.2 | 0.8-1.8 | 2.2-2.6 |
| Si | 0.25-1.2 | 0.15-0.35 | 0.5-0.7 |
| Sn | 0 | 0 | 0 |
| Mg | 0.05-0.3 | 0 | 0 |
| Zn | ≤1 | 0 | 0 |
| Pb | ≤0.05 | 0 | 0 |
| Fe | ≤0.2 | 0 | 0 |
| Mn | ≤0.1 | 0 | 0 |
| P | 0 | 0.01-0.05 | 0 |
| Cr | 0 | 0 | 0.5-0.7 |

The conductive wire components 15 are plated with a conductive material. The conductive material could be any of gold, silver, or nickel. The pin 21 of the male electrical contact is typically plated with the same material as used for the conductive wire components 15. Silver plating the CuNiSi wire components 15 has been found to lower the contact resistance.

The plurality of conductive wire components 15 are arranged so that a direction of extension of each of the conductive wire components 15 are slanted with respect to the longitudinal axis X-X (see e.g., FIGS. 1 and 3) of the wire-carrier 13. As illustrated e.g., in FIG. 3, the direction of extension of each of the conductive wire components 15 is slanted with respect to the longitudinal axis X-X of the wire-carrier 13 by an angle α such that:

$$3° \leq \alpha \leq 15°.$$

In the examples of the figures, the plurality of conductive wire components 15 are arranged hyperbolically so that the wires are configured to align themselves elastically as contact lines around the pin (see reference 21 of FIG. 1), as the pin is introduced in the female electrical contact 1. The plurality of conductive wire components 15 extending in a hyperboloid configuration along the longitudinal axis L of the wire-carrier 13 means that the conductive wire components 15 define a bore along the wire-carrier 13. When the pin 21 of the male electrical contact is inserted into the bore, the conductive wire components 15 yieldingly grasp the pin 21 to provide a number of contact points.

In the example of the figures, the wire carrier 13 is substantially cylindrical. The wire-carrier 13 is configured to define an inner part 17 (see e.g., FIG. 2A) and has a length L along the longitudinal axis X-X (see e.g., FIGS. 1 and 3). The plurality of conductive wire components 15 are arranged in the inner part of the wire-carrier 13.

In the example of the figures, each conductive wire component of the plurality of hyperbolically arranged conductive wire components 15 extends in a substantially straight, but slanted, line in the inner part 17 of the wire-carrier 13. Each conductive wire component of the plurality of hyperbolically arranged conductive wire components 15 also has two curved sections, each curved section being located at a respective extremity of the straight line located in the inner part 17 of the wire-carrier 13. Each curved section of the wire component is mounted over a respective rim of the cylindrical wire-carrier 13. Past each curved section mounted over the rim of the of the cylindrical wire-carrier 13, each wire component includes a straight section defining an extremity of the wire component. Each extremity of each wire component is mounted between an outer part of the cylindrical wire-carrier 13 and an inner part of the substantially cylindrical sleeve 31 (see e.g., FIG. 3).

The wire-carrier is not required to be a continuous structure and can for example be a pair of spaced-apart retaining rings that define the ends of the wire assembly. The conductive wire components may be attached to the rings and extend between the rings to define a space for receiving the pin 21 of the male electrical contact. The wire components, as above, may be slanted with respect to the longitudinal axis of the wire-carrier 13 and may be arranged hyperbolically.

Figure 3:
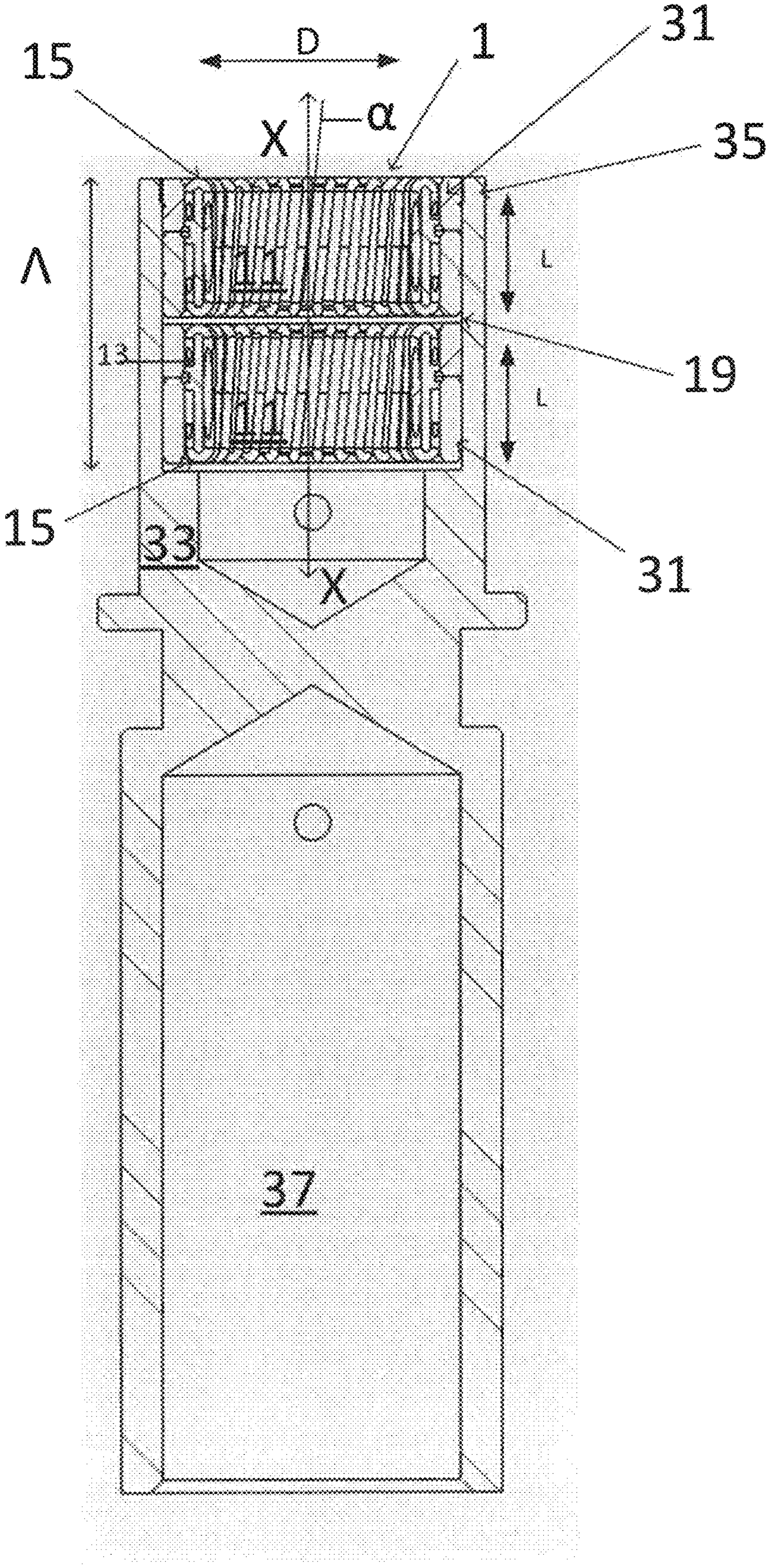
FIG. 3 schematically represent a section view of another example female electrical contact according to the disclosure.

In the examples of the figures, the plurality of conductive wires 15 is configured to contact the pin of the male electrical contact around a receiving diameter D (see e.g., FIGS. 1 and 3). A ratio r of the length L on the diameter D, i.e. a quotient $$r = \frac{L}{D},$$

is such that:

$$r<1.$$

As already stated, having the ratio r under the value 1 causes, in operation of the contact 1, a relatively lower total length of the conductive wires 15 in contact with the pin, compared to a total efficient surface of the other components (such as the wire-carrier 13) of the female electrical contact 1 involved in current conduction, thus increasing the overall conductivity of the female contact 1. In some examples, r may be such that:

$$r\leq 0.750.$$

As also already stated, having the ratio r under the value 1 causes the length L of each of the wire assemblies 11 to be relatively short and enables a female contact of a given length A (see e.g., FIG. 3) to accommodate more than one wire assembly, thus increasing the overall conductivity of the female contact 1. As illustrated e.g., in FIG. 3, the female electrical contact 1 may include at least two wire assemblies 11 mounted in the female electrical contact 1 such that the longitudinal axes X-X of the wire assemblies 11 are substantially aligned with each other, the longitudinal axes X-X corresponding to each other. The example of FIG. 3 includes two wire assemblies 11, but examples with more than two wire assemblies are envisaged.

As already stated, the female electrical contact in the example of the figures is configured to conduct currents of 300-350 A. This is not required in all examples, and the female electrical contact may be configured to conduct higher or lower currents. The current carrying capacity of the female electrical contact can be determined by the receiving diameter, D, the number of wire components, and the thickness of the wires. Generally, the female electrical contact is configured to conduct currents of any of at least 20 A, at least 50 A, at least 200 A, at least 300 A, or at least 400 A.

The value of the ratio r may be kept greater than 0.250 to retain the beneficial mechanical properties of the female contact 1, such that r may be such that:

$$0.250<r.$$

Figure 2A:
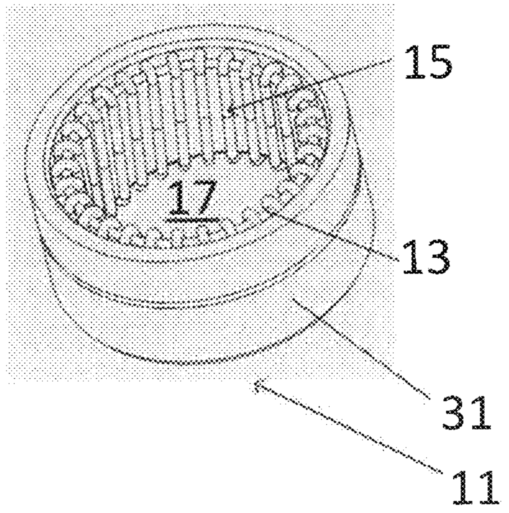
FIGS. 2A and 2B schematically represent elevation views of an example wire assembly according to the disclosure.
Figure 2B:
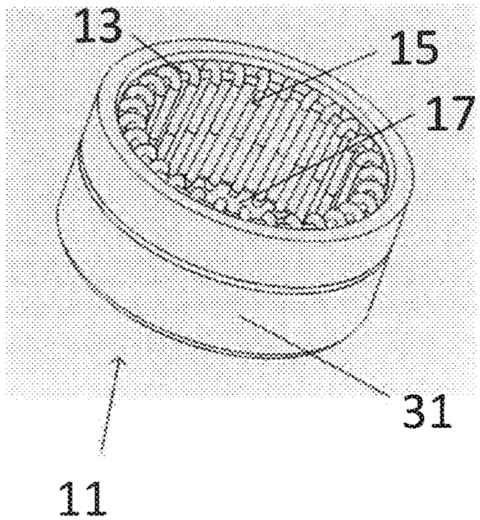

In the examples of FIGS. 1 to 3, $$D=8\text{ mm}$$

$$L=5\text{ mm}$$

$$r=0.625.$$

As illustrated in FIG. 3, adjacent wire assemblies 11 are mounted in the female electrical contact 1 with a space 19 between them, such that the plurality of conductive wire components 15 of one wire assembly 11 is not in contact with a plurality of conductive wire components 15 of another wire assembly 11.

As illustrated in the figures, each wire assembly 11 includes at least one conductive sleeve 31. The sleeve 31 is substantially cylindrical and is configured to accommodate at least partly the wire-carrier 13 and the plurality of conductive wire components 15.

As illustrated in the figures, the female electrical contact 1 further includes a conductive socket 33 for receiving the at least one wire assembly 11. The socket 33 includes a hollow shank 35 configured to receive the sleeve 31 of each wire assembly 11.

As illustrated in the figures, the female electrical contact 1 further includes a wiring extremity 37 for connection of the female electrical contact 1 to an electrical cable (not shown on the figures). The wiring extremity 37 is configured to enable crimping, screwing and/or soldering to the electrical cable. A modification of the wiring extremity 37 is described below in relation to FIGS. 8 to 11.

Each wire-carrier 13 may include brass and/or copper. The material of the sleeve 31 and/or the socket 33 and/or the wiring extremity 37 may include brass and/or copper.

The disclosure also relates to a method of manufacture of a female electrical contact for receiving a male electrical contact, including at least a step of providing at least one wire assembly for receiving a pin of the male electrical contact.

In FIG. 1, a single wire assembly is provided to the female electrical contact. FIGS. 4A, 4B, 5A, 5B, 5C, 6A, 6B and 6C schematically represent example methods 100 of manufacture of female electrical contacts including two wire assemblies 11 as illustrated in FIG. 3.

Figure 4A:
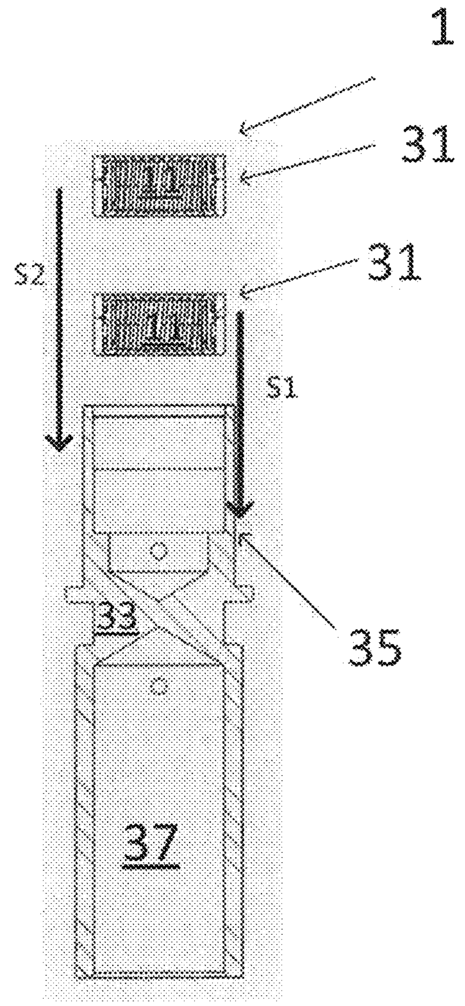
FIGS. 4A, 4B, and 5A, 5B, 5C and 6A, 6B and 6C schematically represent example methods of manufacture of female electrical contacts.
Figure 4B:
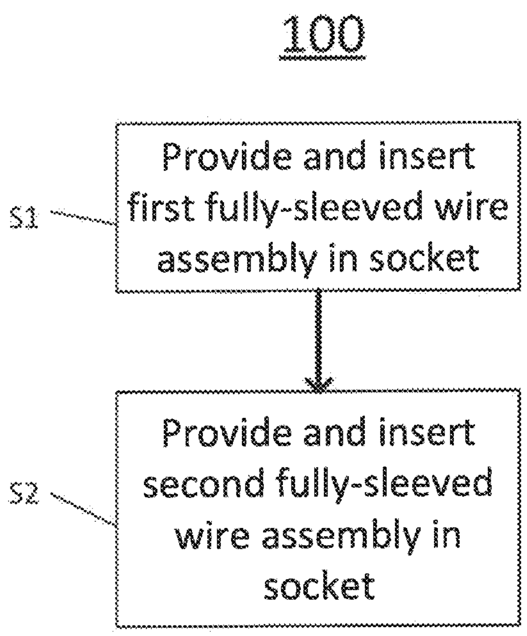

In FIGS. 4A and 4B, a method 100 includes, at S1, providing and inserting a first fully-sleeved wire assembly 11 in the socket 33, and, at S2, providing and inserting a second fully-sleeved wire assembly 11 in the socket 33, to obtain the contact 1 of FIG. 3.

Figure 5A:
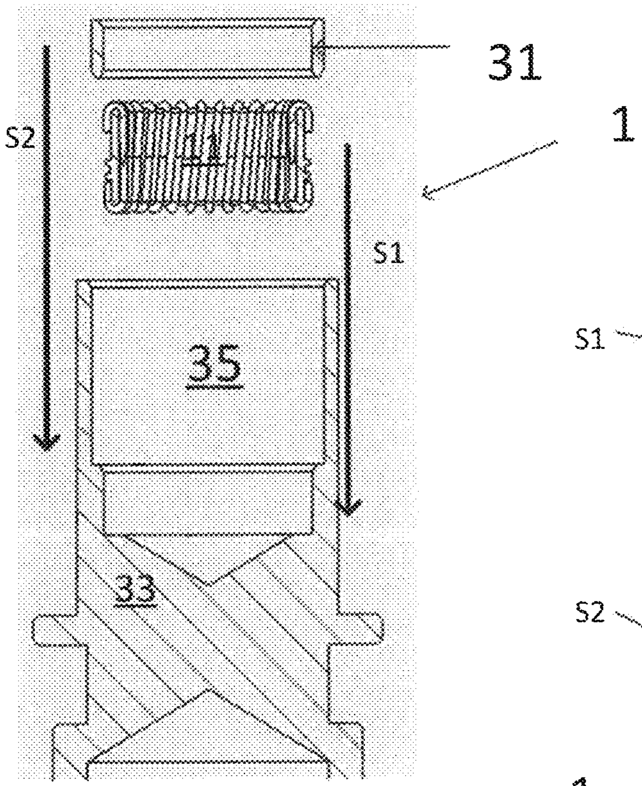
Figure 5B:
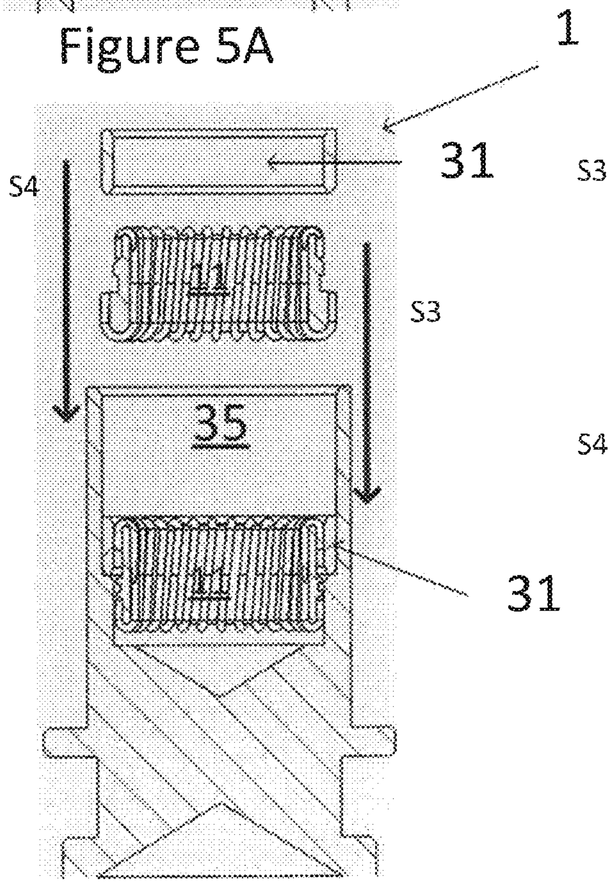
Figure 5C:
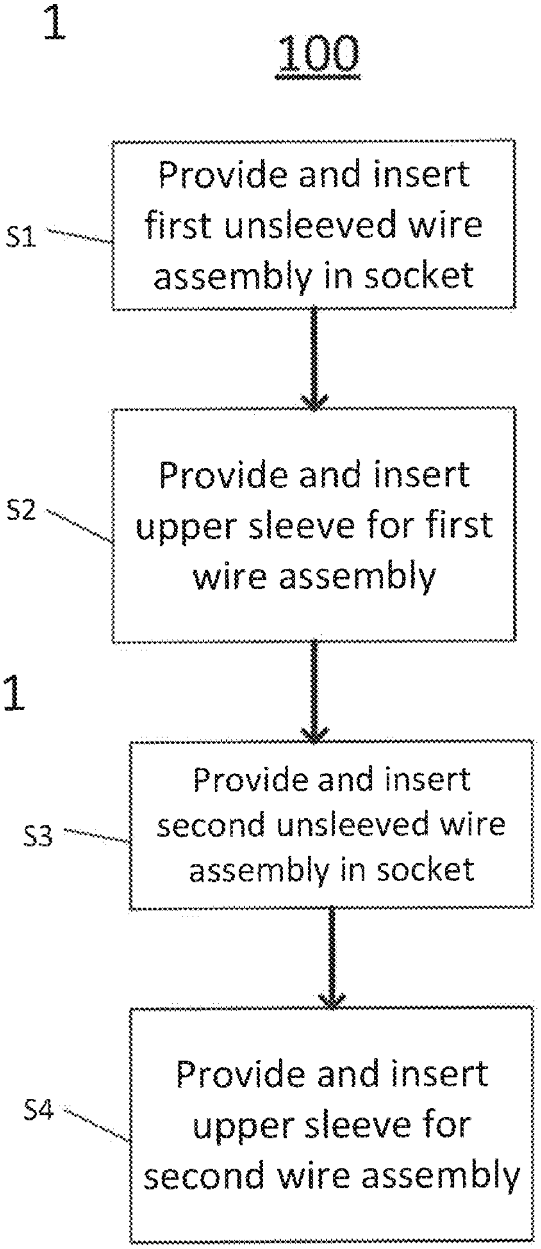

In FIGS. 5A, 5B and 5C, a method 100 includes, at S1, providing and inserting a first unsleeved wire assembly 11 in the socket 33. The socket 33 forms a lower sleeve for the first wire assembly 11. The method 100 includes, at S2, providing and inserting an upper sleeve 31 for the first wire assembly 11. The method 100 further includes, at S3, providing and inserting a second unsleeved wire assembly 11 in the socket 33. The shank 35 forms a lower sleeve for the second wire assembly 11. The method 100 includes, at S4, providing and inserting an upper sleeve 31 for the first wire assembly 11, to obtain the contact 1 of FIG. 3.

Figure 6A:
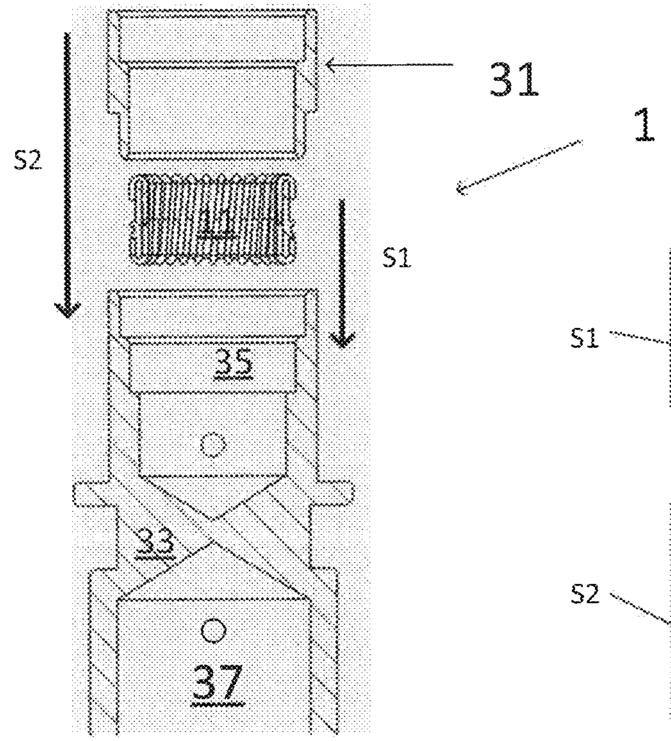
Figure 6B:
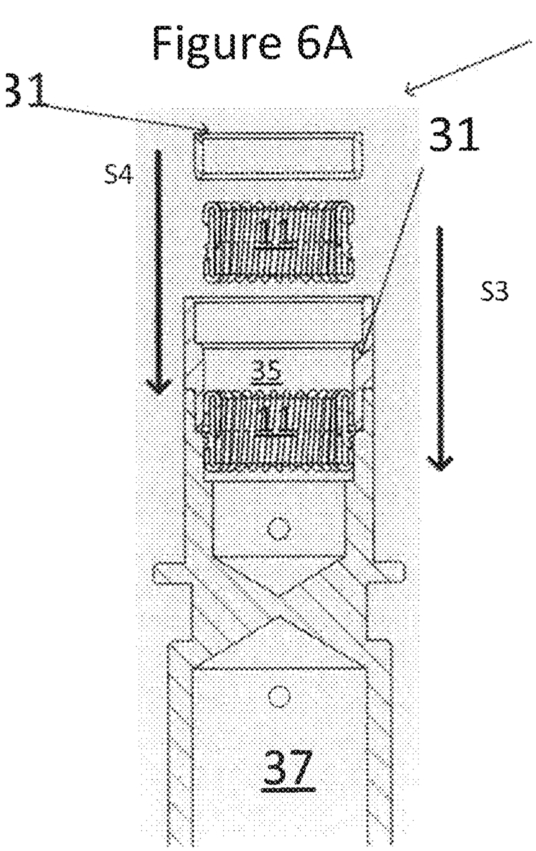
Figure 6C:
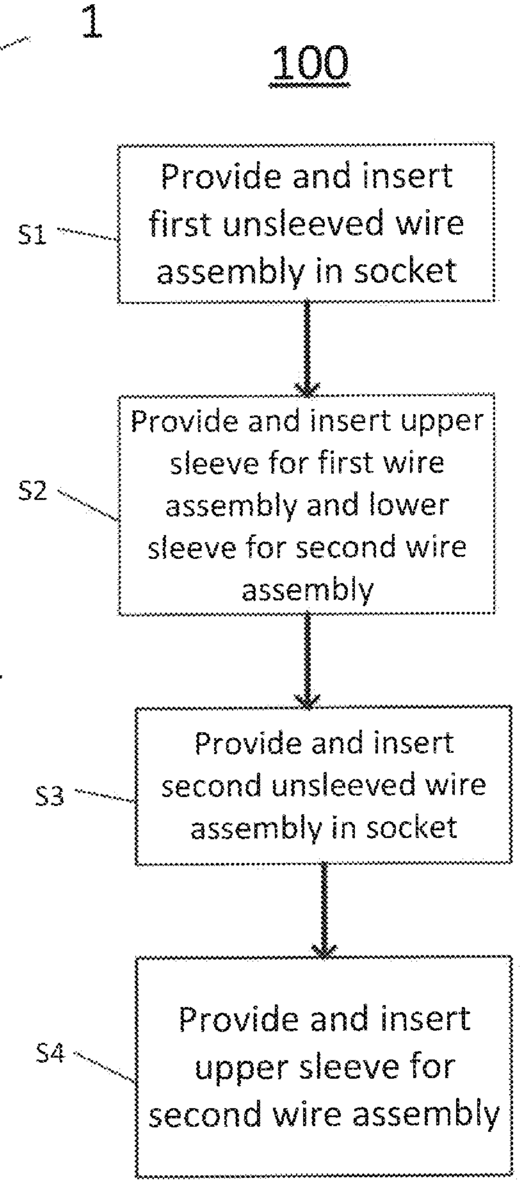

In FIGS. 6A, 6B and 6C, a method 100 includes, at S1, providing and inserting a first unsleeved wire assembly 11 in the socket 33. The socket 33 forms a lower sleeve for the first wire assembly 11. The method 100 includes, at S2, providing and inserting an upper sleeve 31 for the first wire assembly 11. The sleeve 31 of the first wire assembly 11 further extends to form the socket 33 for receiving a second wire assembly 11. The socket 33 for receiving the second wire assembly 11 also forms a lower sleeve 31 for the second wire assembly 11. The method 100 further includes, at S3, providing and inserting the second unsleeved wire assembly 11 in the socket 33. The method 100 includes, at S4, providing and inserting an upper sleeve 31 for the first wire assembly 11, to obtain the contact 1 of FIG. 3.

Figure 7:
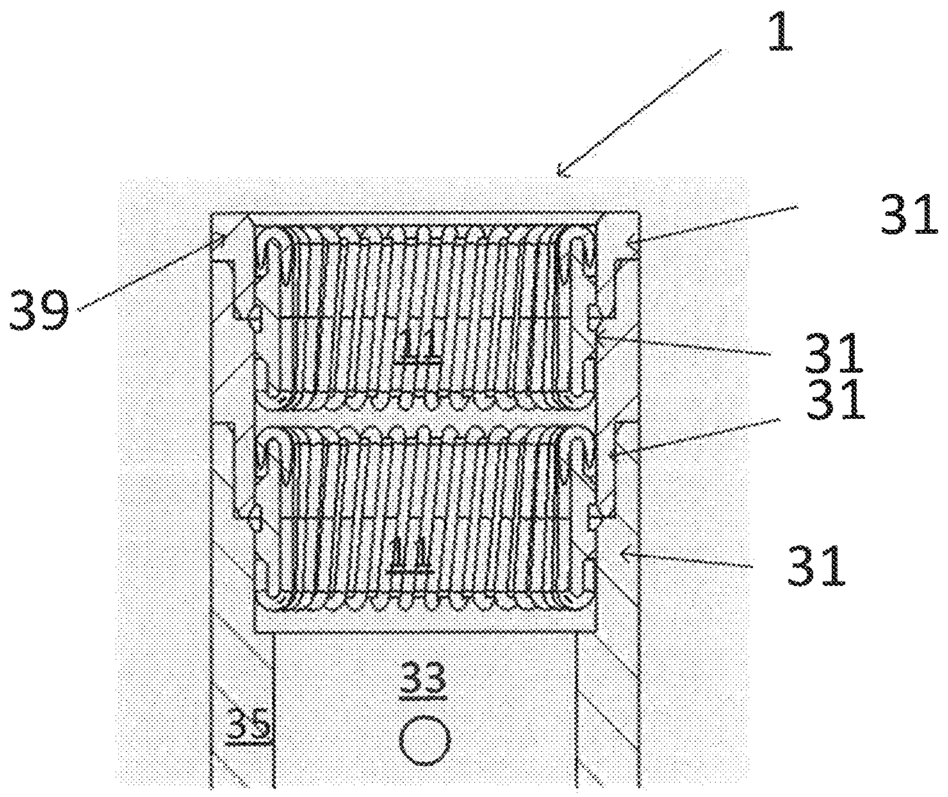
FIG. 7 schematically represent a section view of an extremity of another example female electrical contact according to the disclosure.

As illustrated in FIG. 7, in a variant of the method 100 of FIGS. 6A, 6B and 6C, a contact extremity ring 39 forms the sleeve 31 of the wire assembly 11 located at an extremity of the female electrical contact 1.

The example contacts and methods described above in relation to FIGS. 1 to 7 relate generally to contacts with two or more wire assemblies. This is not required in all aspects of the present disclosure and a contact with a single wire assembly may be provided.

The contact is not required, in all examples, to have a ratio of length of the wire carrier to diameter of the pin that is less than 1. The improved performance benefits of using CuNiSi are achievable with contacts that have a single wire assembly, multiple wire assemblies, and single or multiple wire assemblies where the ratio is less than or greater than 1.

Likewise, performance benefits are achieved when the ratio is less than 1 as described above. These performance benefits are achievable even when CuNiSi wires are not used. Therefore, in single wire assembly or multiple wire assembly examples where the ratio, as described above, is less than 1, the conductive wire components are not required to use CuNiSi. For example, each wire 15 of the at least one wire assembly 11 may be made of: CuBe, gold plated, or CuBe, silver plated, or CuNiSi, silver plated, or CuNiSi, gold plated.

Experiment 1—Electrical Performance in Low Mating Cycle Applications

The electrical performance of four female electrical contacts were tested after 100 mating cycles and 500 mating cycles. A mating cycle refers to the cycle of connecting and disconnecting the male and female electrical contacts. Electrical contacts used in the industrial and railway markets are typically expected to maintain acceptable performance for between 100 and 500 mating cycles.

The four products are all female electrical contacts having a single wire assembly for receiving a pin of a male electrical contact. The length L for each product's wire carrier was 10 mm and the diameter D of the contact pin was 8 mm giving a ratio r of 1.25.

The products differ in the alloy composition used for the wires of the wire assembly.

Product A—CuBe with gold plating

Product B—CuBe with silver plating

Product C—CuNiSi with silver plating. The CuNiSi composition used in Composition 1 of Table 1 above.

Product D—phosphor bronze alloy (CuSnP) with gold plating. A phosphor bronze alloy is an alloy containing copper, tin, and phosphorous.

Electrical performance results for Products A-D are provided in Table 2:

| | Contact resistance (μΩ) | | Temperature (° C.) | | Energy transmitted (kWh) | |
|---|---|---|---|---|---|---|
| | 100 cycles | 500 cycles | 100 cycles | 500 cycles | 100 cycles | 500 cycles |
| Product A | 64 | 65 | 56.9 | 58.3 | 48 | 47 |
| Product B | 57 | 59 | 56.3 | 56.8 | 52 | 50 |
| Product C | 40 | 41 | 52.5 | 53.2 | 62 | 59 |
| Product D | 96 | 97 | 62.2 | 63.4 | 39 | 38 |

Product C (CuNiSi with silver plating) was the best performing contact in this example having the lowest contact resistance, lowest temperature, and highest energy transmitted after 100 mating cycles and 500 mating cycles.

Product D (CuSnP with gold plating) was the worst performing contact across all mating cycles. CuSnP is beryllium-free copper alloy. The results highlight the benefits of using copper-nickel alloys and in particular copper-nickel-silicon alloys for the wires of female electrical contacts over both the established CuBe wires and other possible beryllium-free alternatives like CuSnP.

Comparing Products A and B show that silver plated wires have improved electrical performance as compared to gold plated wires. The performance improvements are less significant than changing the material composition of the wires from CuBe to CuNiSi.

Experiment 2—Electrical Performance in Medium Mating Cycle Applications

The electrical performance of four female electrical contacts were tested after 500 mating cycles and 2000 mating cycles. Electrical contacts used in the defence market are typically expected to maintain acceptable performance for between 500 and 2000 mating cycles.

As per Experiment 1, the four products are all female electrical contacts having a single wire assembly for receiving a pin of a male electrical contact. As above, the ratio r is 1.25.

The products differ in the alloy composition used for the wires of the wire assembly.

Product A—CuBe with gold plating

Product B—CuBe with silver plating

Product C—CuNiSi with silver plating. The CuNiSi composition used in Composition 1 of Table 1 above.

Product D—phosphor bronze alloy (CuSnP) with gold plating.

Electrical performance results for Products A-D are provided in Table 3:

| | Contact resistance (μΩ) | | Temperature (° C.) | | Energy transmitted (kWh) | |
|---|---|---|---|---|---|---|
| | 500 cycles | 2000 cycles | 500 cycles | 2000 cycles | 500 cycles | 2000 cycles |
| Product A | 65 | 67 | 58.3 | 57.9 | 47 | 48 |
| Product B | 59 | 59 | 56.8 | 57.5 | 50 | 50 |
| Product C | 41 | 43 | 53.2 | 54.1 | 59 | 59 |
| Product D | 97 | 97 | 63.4 | 62.4 | 38 | 38 |

Product C (CuNiSi with silver plating) is the best performing contact in this example having the lowest contact resistance, lowest temperature, and highest energy transmitted after 500 mating cycles and 2000 mating cycles.

Product D (CuSnP with gold plating) was the worst performing contact across all mating cycles. CuSnP is beryllium-free copper alloy. The results highlight the benefits of using copper-nickel alloys and in particular copper-nickel-silicon alloys for the wires of female electrical contacts over both the established CuBe wires and other beryllium-free alternatives like CuSnP.

Comparing Products A and B show that silver plated wires have improved electrical performance as compared to gold plated wires. The performance improvements are less significant than changing the material composition of the wires from CuBe to CuNiSi.

Experiment 3—Electrical Performance in High Mating Cycle Applications

The electrical performance of three female electrical contacts were tested after 6000 mating cycles, 10000 mating cycles, and 15000 mating cycles. Electrical contacts used in the electric vehicle market are typically expected to maintain acceptable performance for between 6000 and 15000 mating cycles.

As per Experiment 1, the four products are all female electrical contacts having a single wire assembly for receiving a pin of a male electrical contact. As above, the ratio r is 1.25.

The products differ in the alloy composition used for the wires of the wire assembly.

Product A—CuBe with gold plating.

Product B—CuBe with silver plating.

Product C—CuNiSi with silver plating. The CuNiSi composition used in Composition 1 of Table 1 above.

Electrical performance results for Products A-D are provided in Table 4:

| | Contact resistance (μΩ) | | | Temperature (° C.) | | | Energy transmitted (kWh) | | |
|---|---|---|---|---|---|---|---|---|---|
| | 6000 cycles | 10000 cycles | 15000 cycles | 6000 cycles | 10000 cycles | 15000 cycles | 6000 cycles | 10000 cycles | 15000 cycles |
| Product A | 67 | 68 | 73 | 59.0 | 58.3 | 59.4 | 47 | 47 | 47 |
| Product B | 61 | 64 | 66 | 58.4 | 57.7 | 58.4 | 49 | 48 | 47 |
| Product C | 46 | 48 | 49 | 54.3 | 54.1 | 54.4 | 59 | 57 | 56 |

Product C (CuNiSi with silver plating) is the best performing contact in this example having the lowest contact resistance, lowest temperature rise, and highest energy transmitted after 6000 mating cycles, 10000 mating cycles, and 15000 mating cycles.

Comparing Products A and B show that silver plated wires have improved electrical performance as compared to gold plated wires. The performance improvements are less significant than changing the material composition of the wires from CuBe to CuNiSi.

Experiment 4—Electrical Performance for One and Two Wire Assembly Contacts

The electrical performance of six female electrical contacts were tested after 500 mating cycles. The female electrical contacts differ in the following way:

Product A—single wire assembly; CuBe with gold plating

Product A1—two wire assemblies; CuBe with gold plating

Product B—single wire assembly; CuBe with silver plating

Product B1—two wire assemblies; CuBe with silver plating

Product C—single wire assembly; CuNiSi with silver plating

Product C1—two wire assemblies; CuNiSi with silver plating.

For products A, B, and C the length L of the wire carrier was 10 mm, and the receiving diameter D was 8 mm giving a ratio of 1.25, For products A1, B1, and C1 the length L of each of the two wire carriers was 5 mm and the receiving diameter D was 8 mm giving a ratio of 0.625.

Electrical performance results for Products A-D are provided in Table 5:

| | Contact resistance (μΩ) 500 cycles | Temperature rise (° C.) 500 cycles | Energy transmitted (kWh) 500 cycles |
|---|---|---|---|
| Product A | 65 | 58.3 | 47 |
| Product A1 | 39 | 53.1 | 61 |
| Product B | 59 | 56.8 | 50 |
| Product B1 | 36 | 52.1 | 60 |
| Product C | 41 | 53.2 | 59 |
| Product C1 | 30 | 51.6 | 65 |

Products A1, B1, and C1 have improved performance with respect to their respective single wire-assembly versions.

Product C is the best performing single wire-assembly contact. Product C1 is the best performing double wire-assembly contact.

Female Electrical Contact with Crimping Pin

Figure 8:
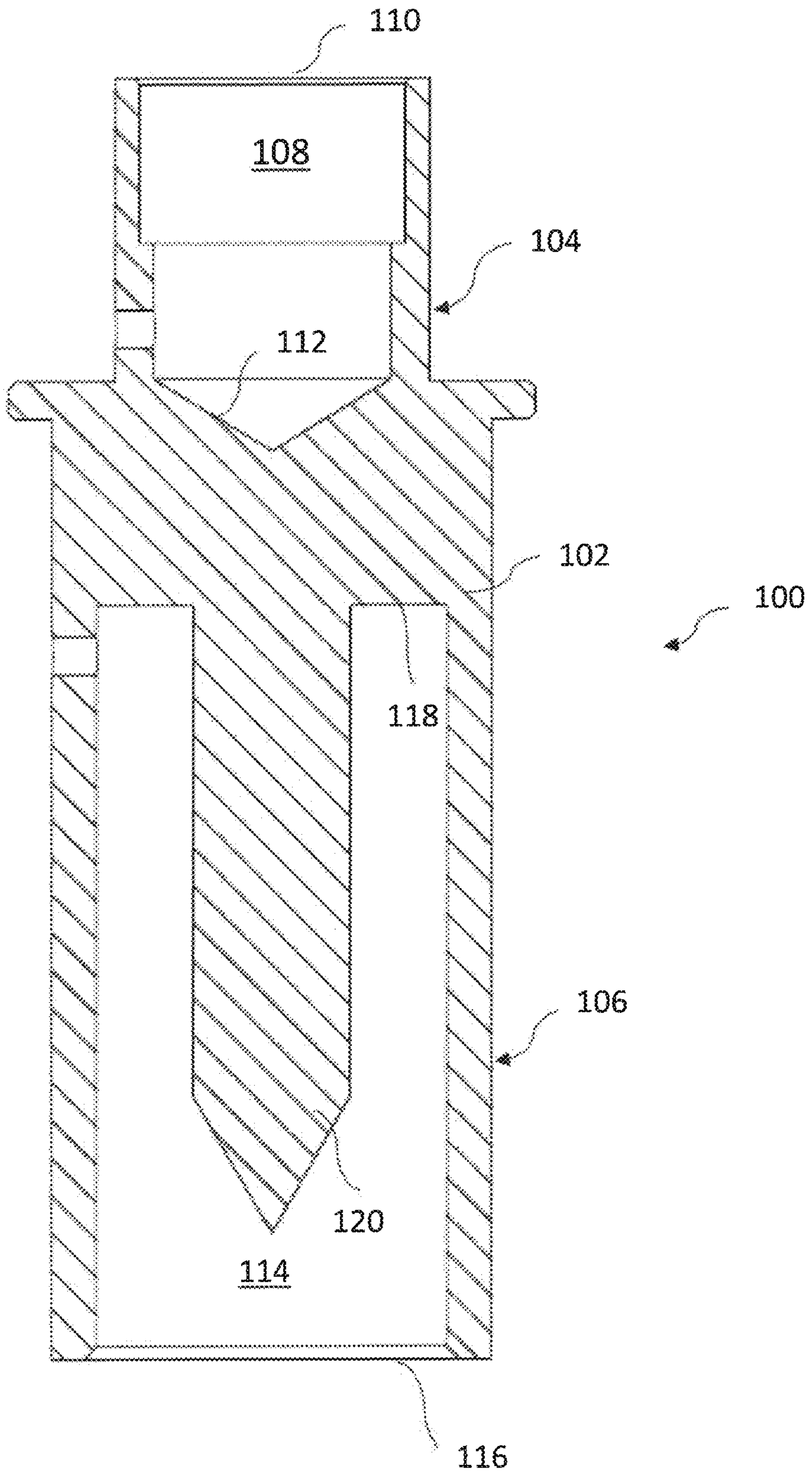
FIG. 8 schematically represents a section view, in the longitudinal direction, of another example female electrical contact according to the disclosure.

FIG. 8 shows a sectional view of another example female electrical contact 100 according to aspects of the present disclosure. The female electrical contact 100 may include any of the features of the female electrical contact 1 described above in relation to FIGS. 1 to 7.

The female electrical contact 100 has a machined metal outer body 102 with a generally cylindrical external shape. The body 102 includes a first end portion 104 and second end portion 106. The first end portion 104 and second end portion 106 are generally cylindrically shaped with the first end portion 104 having a smaller diameter than the second end portion 106.

The first end portion 104 forms a socket 104. The socket 104 defines an internal space in the form of a cylindrical bore/hollow shank 108. The internal space of the socket 104 is bounded by an open end 110 and a closed end 112. The bore 108 reduces in diameter from a first part proximate to the open end 110 to a second part proximate to the closed end 112.

The socket 104 receives at least one wire assembly via the open end 110. The wire assembly includes a wire-carrier and a plurality of conductive wire components carried by the wire-carrier. The at least one wire assembly can be any of the wire assemblies 11 described above in relation to FIGS. 1 to 7. The socket 104 is configured to receive a pin of a male electrical contact as described above in relation to FIGS. 1 to 7. The pin contacts the conductive wire components of any wire assemblies contained within the socket 104 as described above in relation to FIGS. 1 to 7.

The second end portion 106 forms a wiring extremity 106 for connecting the female electrical contact 100 to an electrical cable (not shown). The wiring extremity defines an internal space in the form of a cylindrical bore 114. The internal space of the wiring extremity is bounded by an open end 116 and a closed end 118. The wiring extremity 106 is arranged to receive one or more exposed conductors (strands) at the end of an electrical cable (not shown) so as to connect the female electrical contact 100 to the electrical cable.

A crimping pin 120 is located within the bore 114 and extends from the closed end 118 of the bore 114 towards the open end 116 of the bore 114. The crimping pin 120 is substantially cylindrical along most of its length and tapers to a point towards the open end 116 of the bore 114.

The crimping pin 120 is integral with the remainder of the body 102 of the female electrical contact 100 and is formed as part of the process of machining the body 102 of the female electrical contact 100. In other examples, the crimping pin 120 is manufactured separately and subsequently attached to the body 102 such as by being press-fitted, soldered, or screwed into the closed end 118 of the bore 114.

The body 102 and crimping pin 120 are electrically conductive. The body 102 and crimping pin 120 may include brass and/or copper.

In use, exposed conductors (e.g., exposed wire strands) at the end of an electrical cable (not shown) are inserted into the bore 114 of the wiring extremity 106 via the open end 116. The wiring extremity 106 is then crimped, such as by using a crimping tool, to join the electrical cable to the female electrical contact 100. This forms an electrical and mechanical coupling between the female electrical contact 100 and the electrical cable.

Figure 9:
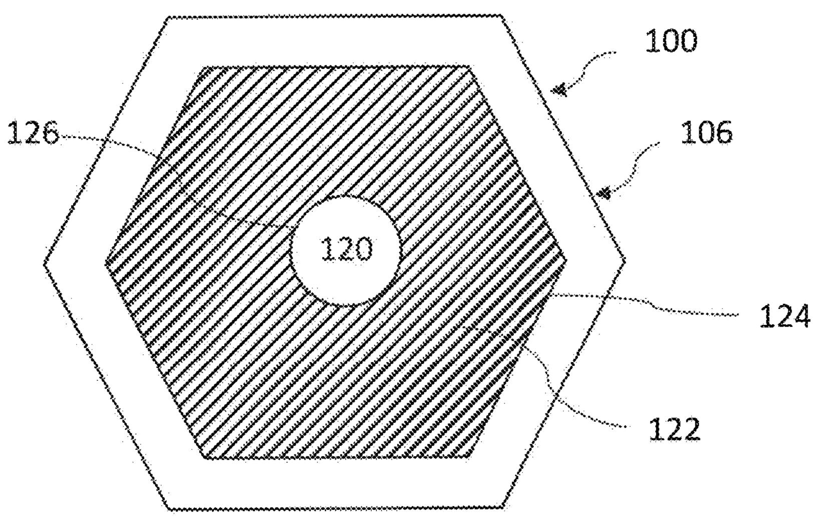
FIG. 9 schematically represents a section view in the axial direction of the female electrical contact of FIG. 8 after crimping.
Figure 10:
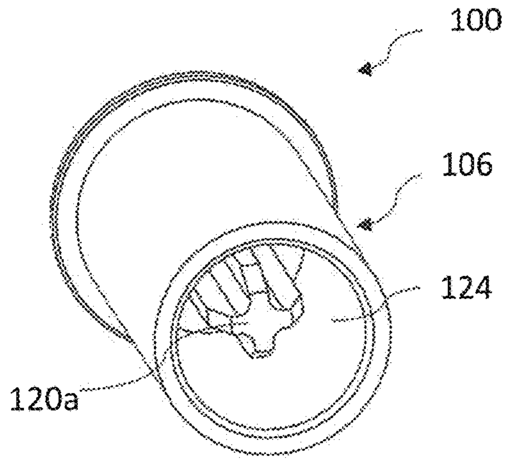
FIGS. 10 and 11 show additional example wiring extremity arrangements according to the disclosure.

FIG. 9 shows a cross-sectional view through the wiring extremity 106 after crimping. In this example, a hexagonal crimping tool is used such the wiring extremity 106 has a hexagonal cross-section after crimping.

The exposed conductors of the electrical cable are represented by the diagonal lines 122 in FIG. 9. The exposed conductors of the electrical cable contact the inner surface wall 124 of the wiring extremity 106. The exposed conductors of the electrical cable also contact the surface 126 of the crimping pin 120. The crimping pin 120 therefore increases the surface area of contact between the exposed conductors of the electrical cable and the wiring extremity 106 compared to wiring extremities without a crimping pin. The greater surface area of contact reduces the contact resistance between the electrical cable and the female electrical contact 100. This reduced contact resistance improves the power transfer capabilities of the female electrical contact. In one example, the contact resistance between the wiring extremity 106 and cable is 13μΩ when the crimping pin 120 is included and 20μΩ when the crimping pin is not present.

Figure 11:
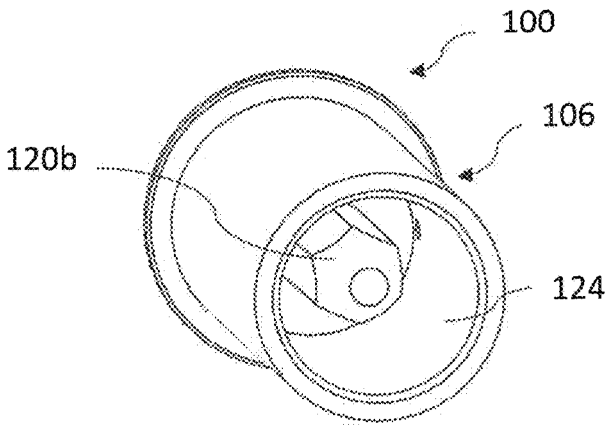

The crimping pin is not required to be a cylindrical pin. The crimping pin can be in the form of other shapes such as with a cross-shaped cross-section 120*a* (FIG. 10) or a hexagonal cross-section 120*b* (FIG. 11). Any shape of crimping pin that increases the available surface area for contact with the electrical cable can be used. More than one crimping pin may be provided.

The female electrical contacts 1, 100 described above may form part of a charger plug for supplying electric energy to an electric vehicle. The charger plug may include a connector including at least one female electrical contact 1, 100. The charger plug is arranged to engage with a charging receiver of the electric vehicle. The charging receiver includes a connecter including at least one corresponding male electrical contact. Alternatively, the charger plug may include the male electrical contact and the charging receiver may include the female electrical contact 1, 100.

NUMBERED EXAMPLES

Example 1: A female electrical contact for receiving a male electrical contact, including:

at least one wire assembly for receiving a pin of the male electrical contact, wherein each wire assembly includes:

a conductive, substantially cylindrical wire-carrier defining an inner part and having a length L along a longitudinal axis, and a plurality of conductive wires, the plurality of conductive wires being arranged in the inner part of the wire-carrier so that a direction of extension of each of the conductive wires is slanted with respect to the longitudinal axis of the wire-carrier, wherein the plurality of conductive wires is configured to contact the pin of the male electrical contact around a receiving diameter D, wherein a ratio r of the length L on the diameter D is such that:

$$r<1.$$

Example 2: The female electrical contact of Example 1, including at least two wire assemblies mounted in the female electrical contact such that the longitudinal axes of the wire assemblies are substantially aligned with each other, the longitudinal axes corresponding to each other.

Example 3: The female electrical contact of Example 1 or 2, wherein r is such that:

$$0.250 < r \leq 0.750,$$

wherein r may be substantially equal to 0.625.

Example 4: The female electrical contact of any of Examples 1 to 3, wherein:

$$D=8 \text{ mm}$$

$$L=5 \text{ mm}.$$

Example 5: The female electrical contact of any of Examples 1 to 4, wherein, when the female electrical contact includes at least two wire assemblies, adjacent wire assemblies are mounted in the female electrical contact with a space between them, such that the plurality of conductive wires of one wire assembly is not in contact with a plurality of conductive wires of another wire assembly.

Example 6: The female electrical contact of any of Examples 1 to 5, wherein each wire assembly includes at least one conductive sleeve, the sleeve being substantially cylindrical and configured to accommodate at least partly the wire-carrier and the plurality of conductive wires, and wherein the female electrical contact further includes a conductive socket for receiving the at least one wire assembly, wherein the socket includes a hollow shank configured to receive the sleeve of each wire assembly, optionally wherein the material of the sleeve and/or the socket includes: brass and/or copper.

Example 7: The female electrical contact of any of Examples 1 to 6, wherein, when the female electrical contact includes at least two wire assemblies, the sleeve of one wire assembly further extends to form the socket for receiving another wire assembly, a contact extremity ring forming the sleeve of a wire assembly located at an extremity of the female electrical contact.

Example 8: The female electrical contact of any of Examples 1 to 7, wherein each wire of the at least one wire assembly is made of:

CuBe, gold plated, or

CuBe, silver plated, or

CuNiSi, silver plated, or

CuNiSi, gold plated.

Example 9: The female electrical contact of any of Examples 1 to 8, wherein each wire-carrier includes brass and/or copper.

Example 10: The female electrical contact of any of Examples 1 to 9, wherein the direction of extension of each of the conductive wires is slanted with respect to the longitudinal axis of the wire-carrier by an angle α such that:

$$3° \leq \alpha \leq 15°.$$

Example 11: The female electrical contact of any of Examples 1 to 10, wherein the plurality of conductive wires is arranged hyperbolically in the inner part of the wire-carrier, so that the wires are configured to align themselves elastically as contact lines around the pin, as the pin is introduced in the female electrical contact.

Example 12: The female electrical contact of any of Examples 1 to 11, further including a wiring extremity for connection of the female electrical contact to an electrical cable, optionally wherein the wiring extremity is configured to enable crimping, screwing and/or soldering to the electrical cable.

Example 13: The female electrical contact of any of Examples 1 to 12, configured to conduct currents of 300-350 A.

Example 14: A method of manufacture of a female electrical contact for receiving a male electrical contact, including:

providing at least one wire assembly for receiving a pin of the male electrical contact, wherein each of wire assembly includes:

a conductive, substantially cylindrical wire-carrier defining an inner part and having a length L along a longitudinal axis, and a plurality of conductive wires, the plurality of conductive wires being arranged in the inner part of the wire-carrier so that a direction of extension of each of the conductive wires is slanted with respect to the longitudinal axis of the wire-carrier, wherein the plurality of conductive wires is configured to contact the pin of the male electrical contact around a receiving diameter D, wherein providing the at least one wire assembly includes providing the at least one wire assembly with a ratio r of the length L on the diameter D such that:

$$r < 1.$$

Example 15: The method of Example 14, including steps to manufacture the female electrical contact of any of Examples 2 to 13.

What is claimed is:

1. A female electrical contact for receiving a male electrical contact, the female electrical contact comprising:

at least one wire assembly for receiving a pin of the male electrical contact, wherein each wire assembly comprises:

a conductive, substantially cylindrical wire-carrier defining an inner part and having a length L along a longitudinal axis; and a plurality of conductive wire components configured to contact the pin of the male electrical contact, wherein the plurality of conductive wire components are arranged in the inner part of the wire-carrier so that a direction of extension of each of the conductive wire components is slanted with respect to the longitudinal axis of the wire-carrier, wherein the plurality of conductive wire components are arranged hyperbolically in the inner part of the wire-carrier with a straight section of each of the conductive wire components extending along a first side of the wire-carrier and a curved section of each of the conductive wire components being wrapped around each opposing end of the wire-carrier from the first side to a second side of the wire carrier, and wherein each curved section extends to the second side of the wire-carrier, the straight sections of the plurality of conductive wire components configured to align elastically as contact lines around the pin, as the pin is introduced in the female electrical contact, and wherein the plurality of conductive wire components comprise a beryllium-free copper-nickel-silicon alloy;

a conductive socket configured to receive the at least one wire assembly; and a wiring extremity for connection of the female electrical contact to an electrical cable, wherein the socket and wiring extremity are arranged at opposing ends of the female electrical contact.

2. A female electrical contact as claimed in claim 1, wherein the copper-nickel-silicon alloy comprises between 94.0% wt and 99.1% wt copper.

3. A female electrical contact as claimed in claim 1, wherein the copper-nickel-silicon alloy comprises between 0.8% wt, and 4.2% wt nickel.

4. A female electrical contact as claimed in claim 1, wherein the copper-nickel-silicon alloy comprises between 0.1% wt and 1.8% wt silicon.

5. A female electrical contact as claimed in claim 1, wherein the copper-nickel-silicon alloy comprises between 94.1% wt and 97.5% wt copper, between 2.2% wt and 4.2% wt nickel, and between 0.2% wt and 1.2% wt silicon.

6. A female electrical contact as claimed in claim 1, wherein the plurality of conductive wire components are one of gold plated, silver plated, and nickel plated.

7. A female electrical contact as claimed in claim 1, wherein the at least one wire assembly comprises at least one conductive sleeve configured to accommodate at least partly the wire-carrier and the plurality of conductive wire components, and wherein the socket is configured to receive the sleeve of the at least one wire assembly.

8. A female electrical contact as claimed in 1, wherein the wiring extremity defines an internal space arranged to receive an electrical cable, and wherein the wiring extremity is configured to be crimped to join the female electrical contact and the electrical cable.

9. A female electrical contact as claimed in claim 8, wherein the internal space of the wiring extremity is bounded by a closed end and an open end, and wherein a crimping pin is located within the internal space and extends from the closed end of the wiring extremity towards the open end.

10. A female electrical contact as claimed in claim 9, wherein the crimping pin is integrally formed with the closed end of the wiring extremity.

11. A female electrical contact as claimed in claim 9, wherein the crimping pin has any of a cylindrical, a cross-shaped, or a hexagonal cross-section.

12. A female electrical contact as claimed in claim 1, configured to conduct currents of at least 20 A.

13. A female electrical contact as claimed in claim 1, comprising at least two wire assemblies, wherein the at least two wire assemblies are mounted in the female electrical contact such that the longitudinal axes of the wire assemblies are substantially aligned with each other, the longitudinal axes corresponding to each other.

14. A female electrical contact as claimed in claim 13, wherein adjacent wire assemblies are mounted in the female electrical contact with a space between them, such that the plurality of conductive wire components of one wire assembly is not in contact with a plurality of conductive wire components of another wire assembly.

15. A female electrical contact as claimed in claim 1, wherein each wire-carrier comprises brass and/or copper.

16. A female electrical contact as claimed in claim 1, wherein the direction of extension of each of the conductive wire components is slanted with respect to the longitudinal axis of the wire-carrier by an angle α such that:

$$3° \leq \alpha \leq 15°.$$

17. A female electrical contact as claimed in claim 1, wherein the plurality of conductive wire components are configured to contact the pin of the male electrical contact around a receiving diameter D, wherein a ratio r of the length L on the diameter D is such that:

$$r<1.$$

18. A female electrical contact as claimed in claim 17, wherein r is such that:

$$0.250 < r \leq 0.750.$$

19. A female electrical contact as claimed in claim 1, wherein the plurality of conductive wire components is formed from a single wire.

* * * * *